(12) United States Patent
Hansen et al.

(10) Patent No.: US 8,762,012 B2
(45) Date of Patent: Jun. 24, 2014

(54) METHOD AND APPARATUS FOR CONTROLLING A MULTI-MODE TRANSMISSION

(75) Inventors: R. Anthony Hansen, Redford, MI (US); Jeffrey Michael Pieper, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

(21) Appl. No.: 13/460,906

(22) Filed: May 1, 2012

(65) Prior Publication Data

US 2013/0297156 A1  Nov. 7, 2013

(51) Int. Cl.
*G06F 7/00* (2006.01)

(52) U.S. Cl.
USPC ................................ 701/51; 477/3; 475/5

(58) Field of Classification Search
USPC ............ 701/51, 60; 475/5, 10, 271, 275, 276; 477/3, 5, 175
See application file for complete search history.

(56) References Cited

U.S. PATENT DOCUMENTS

| | | | |
|---|---|---|---|
| 6,953,409 B2* | 10/2005 | Schmidt et al. | 475/5 |
| 7,074,160 B1* | 7/2006 | Inoue et al. | 477/180 |
| 7,645,206 B2* | 1/2010 | Holmes et al. | 475/5 |
| 8,138,703 B2* | 3/2012 | Heap et al. | 318/432 |
| 8,182,390 B2* | 5/2012 | Sah et al. | 477/3 |
| 2003/0083170 A1* | 5/2003 | Ooyama | 475/216 |
| 2005/0080535 A1* | 4/2005 | Steinmetz et al. | 701/51 |
| 2006/0194670 A1* | 8/2006 | Heap et al. | 477/3 |
| 2006/0293148 A1* | 12/2006 | Smith et al. | 477/175 |
| 2009/0093336 A1* | 4/2009 | Soliman et al. | 477/5 |
| 2009/0118080 A1* | 5/2009 | Heap et al. | 477/3 |
| 2009/0143188 A1* | 6/2009 | Soliman et al. | 477/5 |

OTHER PUBLICATIONS

U.S. Appl. No. 13/460,892, Hansen et al.

* cited by examiner

*Primary Examiner* — Helal A Algahaim
*Assistant Examiner* — Shardul Patel (57) ABSTRACT

A powertrain system includes a multi-mode transmission configured to transfer torque among an input member, torque machines and an output member. A method for controlling operation of the multi-mode transmission includes determining torque commands for the torque machines in response to a desired input speed of the input member and an output speed of the output member determined based upon an estimated wheel speed of a wheel of a driveline coupled to the output member. The estimated wheel speed of the wheel is set equal to a monitored wheel speed of the wheel upon detecting an abrupt decrease in the wheel speed. Torque commands are determined for the torque machines in response to the desired input speed and the monitored wheel speed.

18 Claims, 5 Drawing Sheets

METHOD AND APPARATUS FOR CONTROLLING A MULTI-MODE TRANSMISSION

TECHNICAL FIELD

This disclosure is related to multi-mode transmissions employed in powertrain systems.

BACKGROUND

The statements in this section merely provide background information related to the present disclosure. Accordingly, such statements are not intended to constitute an admission of prior art.

Hybrid powertrain systems include torque generative devices, e.g., internal combustion engines and non-combustion motors that transfer torque through a transmission device to an output member that may be coupled to a driveline. Control systems for operating hybrid powertrain systems control torque outputs of the torque-generative devices and application of torque transfer elements in the transmission to transfer torque in response to operator-commanded output torque requests, taking into account fuel economy, emissions, driveability, and other factors.

SUMMARY

A powertrain system includes a multi-mode transmission configured to transfer torque among an input member, torque machines and an output member. A method for controlling operation of the multi-mode transmission includes determining torque commands for the torque machines in response to a desired input speed of the input member and an output speed of the output member determined based upon an estimated wheel speed of a wheel of a driveline coupled to the output member. The estimated wheel speed of the wheel is set equal to a monitored wheel speed of the wheel upon detecting an abrupt decrease in the wheel speed. Torque commands are determined for the torque machines in response to the desired input speed and the monitored wheel speed.

BRIEF DESCRIPTION OF THE DRAWINGS

One or more embodiments will now be described, by way of example, with reference to the accompanying drawings, in which.

DETAILED DESCRIPTION

Figure 1:
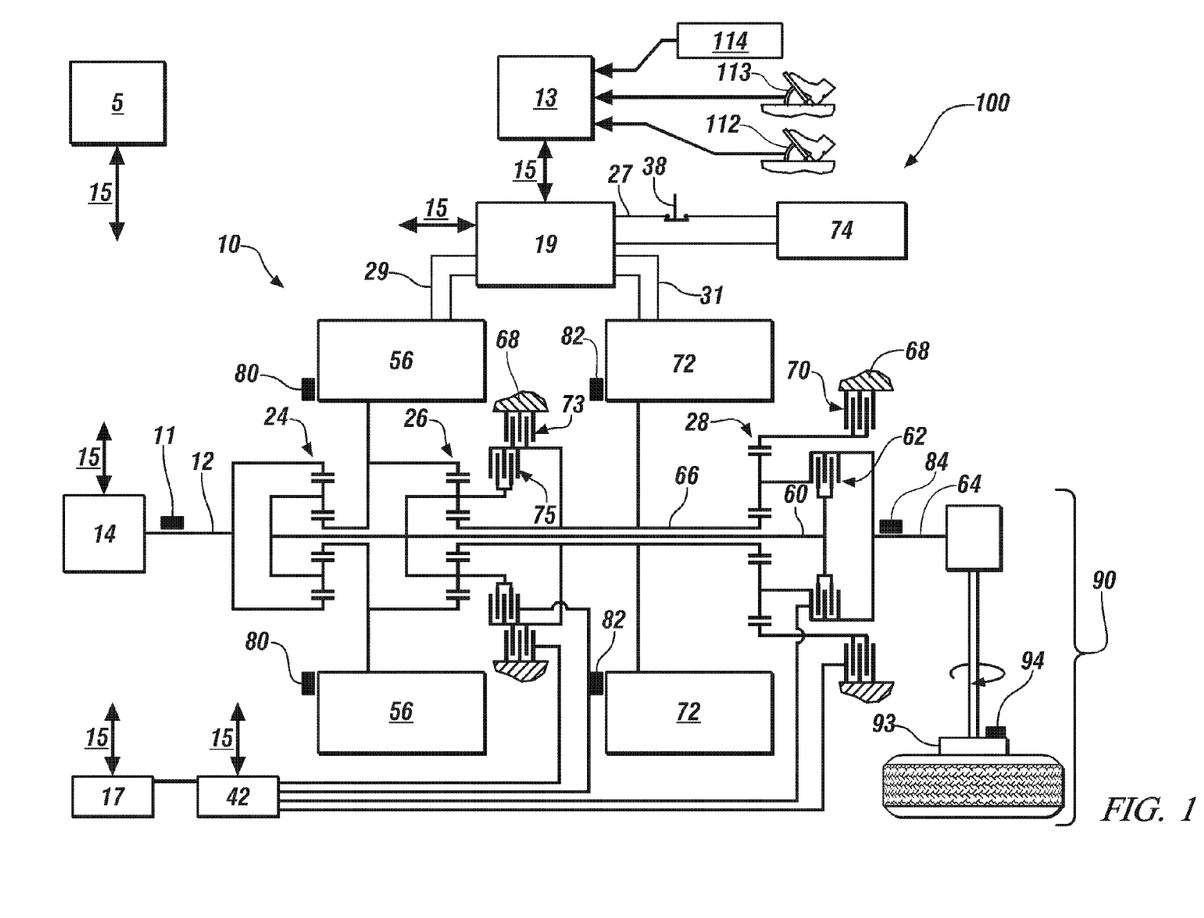
FIG. 1 illustrates a powertrain system including an internal combustion engine, a multi-mode transmission, a driveline, and a controller in accordance with the disclosure.

Referring now to the drawings, wherein the showings are for the purpose of illustrating certain exemplary embodiments only and not for the purpose of limiting the same, FIG. 1 depicts a powertrain system 100 that includes an internal combustion engine (engine) 14, a multi-mode electro-mechanical transmission (transmission) 10, a driveline 90, and a controller 5. The transmission 10 mechanically couples to the engine 14 and includes first and second torque machines 56 and 72, which are electric motor/generators in one embodiment. The engine 14 and first and second torque machines 56 and 72 each generate torque that can be transferred to the transmission 10.

The engine 14 may be any suitable combustion device, and includes a multi-cylinder internal combustion engine selectively operative in several states to transfer torque to the transmission 10 via an input member 12, and can be a spark-ignition or a compression-ignition engine. The engine 14 includes a crankshaft operatively coupled to the input member 12 of the transmission 10. A rotational speed sensor 11 monitors rotational speed of the input member 12. Power output from the engine 14, i.e., rotational speed and engine torque, can differ from the input speed and the input torque to the transmission 10 due to placement of torque-consuming components on the input member 12 between the engine 14 and the transmission 10, e.g., a torque management device.

The illustrated transmission 10 is a two-mode, compound-split, electro-mechanical transmission 10 that includes three planetary-gear sets 24, 26 and 28, and four engageable torque-transferring devices, i.e., clutches C1 70, C2 62, C3 73, and C4 75. Other multi-mode transmissions may instead be employed. As used herein, clutches refer to torque transfer devices that can be selectively applied in response to a control signal, and may be any suitable devices including by way of example single or compound plate clutches or packs, one-way clutches, band clutches or brakes. A hydraulic circuit 42 is configured to control clutch states of each of the clutches, with pressurized hydraulic fluid supplied by an electrically-powered hydraulic pump 17 that is operatively controlled by the controller 5. Clutches C2 62 and C4 75 are hydraulically-applied rotating friction clutches. Clutches C1 70 and C3 73 are hydraulically-controlled brake devices that can be grounded to a transmission case 68. Each of the clutches C1 70, C2 62, C3 73, and C4 75 is hydraulically applied using pressurized hydraulic fluid supplied by the hydraulic control circuit 42 in this embodiment. The hydraulic circuit 42 is operatively controlled by the controller 5 to activate and deactivate the aforementioned clutches, provide hydraulic fluid for cooling and lubricating elements of the transmission, and provide hydraulic fluid for cooling the first and second torque machines 56 and 72. Hydraulic pressure in the hydraulic circuit 42 may be determined by measurement using pressure sensor(s), by estimation using on-board algorithms, or using other suitable methods.

The first and second torque machines 56 and 72 are three-phase AC motor/generator machines, each including a stator and a rotor, and respective resolvers 80 and 82. The motor stator for each machine is grounded to an outer portion of the transmission case 68, and includes a stator core with coiled electrical windings extending therefrom. The rotor for the first torque machine 56 is supported on a hub plate gear that is operatively attached to shaft 60 via the second planetary gear set 26. The rotor for the second torque machine 72 is fixedly attached to a sleeve shaft hub 66. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second torque machines 56 and 72. Additionally, the signals output from the resolvers 80 and 82 may be used to determine rotational speeds for first and second torque machines 56 and 72.

The transmission 10 includes an output member 64, e.g. a shaft, which is rotatably connected to the driveline 90 to provide output power to the driveline 90 that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a wheel speed sensor 94 adapted to monitor wheel speed to determine vehicle speed, and absolute and relative wheel speeds for braking control, traction control, and vehicle acceleration management.

The input torque from the engine 14 and the motor torques from the first and second torque machines 56 and 72 are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 74 to AC power for powering respective ones of the first and second torque machines 56 and 72 by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 56 and 72 for operation as motors or generators via transfer conductors 29 and 31 respectively.

The TPIM 19 transfers electrical power to and from the first and second torque machines 56 and 72 through the pair of power inverters and respective motor control modules in response to the motor torque commands. Electrical current is transmitted to and from the ESD 74 in accordance with whether the ESD 74 is being charged or discharged.

The controller 5 signally and operatively links to various actuators and sensors in the powertrain system 100 via a communications link 15 to monitor and control operation of the powertrain system 100, including synthesizing information and inputs, and executing routines to control actuators to meet control objectives related to fuel economy, emissions, performance, driveability, and protection of hardware, including batteries of ESD 74 and the first and second torque machines 56 and 72. The controller 5 is a subset of an overall vehicle control architecture, and provides coordinated system control of the powertrain system 100. The controller 5 may include a distributed control module system that includes individual control modules including a supervisory control module, an engine control module, a transmission control module, a battery pack control module, and the TPIM 19. A user interface 13 is preferably signally connected to a plurality of devices through which a vehicle operator directs and commands operation of the powertrain system 100. The devices preferably include an accelerator pedal 113, an operator brake pedal 112, a transmission range selector 114 (PRNDL), and a vehicle speed cruise control. The transmission range selector 114 may have a discrete number of operator-selectable positions, including the rotational direction of the output member 64 to enable one of a forward and a reverse direction. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain system 100 is configured to operate in one of several states that can be described in terms of engine states including one of an engine-on state (ON) and an engine-off state (OFF), and transmission ranges including fixed gear modes, continuously variable (EVT) modes, and Neutral, described with reference to Table 1, below.

TABLE 1

| Description | Engine State | Transmission Range | Applied Clutches | |
|---|---|---|---|---|
| Neutral | ON/OFF | Neutral | — | |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

The transmission ranges described in Table 1 indicate the specific applied one(s) of clutches C1 70, C2 62, C3 73, and C4 75 for each of the transmission ranges including fixed gear modes, EVT modes, and Neutral. The transmission 10 is described as a multi-mode electro-mechanical transmission because it is configured to operate in one of a plurality of EVT modes, including Mode 1 and Mode 2 in this embodiment. For purposes of this description, when the engine state is OFF, the engine input speed is equal to 0 RPM, i.e., the engine crankshaft is not rotating. A fixed gear operation provides a fixed ratio operation of input-to-output speed of the transmission 10. In response to operator input via the accelerator pedal 113, the brake pedal 112, and the transmission range selector 114, as captured by the user interface 13, the control module 5 determines torque commands to control the torque actuators including the engine 14 and the first and second torque machines 56 and 72 to meet the output torque request at the output member 64 for transference to the driveline 90.

Operation of the exemplary powertrain system 100 is deterministic, with torque commands, torque outputs and operating speeds determined based upon known torque commands, torque outputs and operating speeds. Deterministic relationships are established based upon the present transmission range, including one of the fixed gear mode, the EVT mode, and Neutral. Different transmission range equations are employed to describe the relationship based upon the transmission range.

The relationships associated with operating in one of the fixed gear ranges include transmission range equations describing a speed relationship, shown with reference to EQ. 1 and a torque relationship, shown with reference to EQ. 2. The speed relationship in the fixed gear mode is set forth below:

$$\begin{bmatrix} N_I \\ N_A \\ N_B \end{bmatrix} = \begin{bmatrix} A1 \\ A2 \\ A3 \end{bmatrix} N_O \qquad [1]$$

wherein $N_I$ is input speed of the input member 12, $N_O$ is output speed of the output member 64, $N_A$ is rotational speed of the first torque machine 56, $N_B$ is rotational speed of the second torque machine 72, and A1, A2, and A3 are application-specific and fixed gear mode-specific scalar values.

The torque relationship in the fixed gear mode is set forth below:

$$T_A = \begin{bmatrix} A4 & A5 & A6 & A7 \end{bmatrix} \begin{bmatrix} T_I \\ T_B \\ T_O \\ \dot{N}_I \end{bmatrix} \qquad [2]$$

wherein $T_A$ is torque command for the first torque machine 56, $T_I$ is the input torque at the input member 12, $T_B$ is torque command for the second torque machine 72, $T_O$ is the output torque of the output member 64, $\dot{N}_I$ is a time-rate change in the input speed $N_I$, and A4-A7 are application-specific and fixed gear mode-specific scalar values.

The relationships associated with operating in one of the EVT modes include transmission range equations describing a speed relationship, shown with reference to EQ. 3 and a torque relationship, shown with reference to EQ. 4. The speed relationship in the EVT mode is set forth below:

$$\begin{bmatrix} N_A \\ N_B \end{bmatrix} = \begin{bmatrix} B1 & B2 \\ B3 & B4 \end{bmatrix} \begin{bmatrix} N_I \\ N_O \end{bmatrix} \qquad [3]$$

wherein B1-B4 are application-specific and EVT mode-specific scalar values.

The torque relationship in the EVT mode is as follows:

$$\begin{bmatrix} T_A \\ T_B \end{bmatrix} = \begin{bmatrix} B5 & B6 & B7 & B8 \\ B9 & B10 & B11 & B12 \end{bmatrix} \begin{bmatrix} T_I \\ T_O \\ \dot{N}_I \\ \dot{N}_O \end{bmatrix} \qquad [4]$$

wherein $\dot{N}_I$ is a time-rate change in the input speed $N_I$, $\dot{N}_O$ is a time-rate change in the output speed $N_O$, and B5-B12 are application-specific and EVT mode-specific scalar values.

The relationships associated with operating in Neutral include transmission range equations describing a speed relationship, shown with reference to EQ. 5 and a torque relationship, shown with reference to EQ. 6. The speed relationship in Neutral is set forth below:

$$\begin{bmatrix} N_A \\ N_B \end{bmatrix} = \begin{bmatrix} C1 & C2 & C3 \\ C4 & C5 & C6 \end{bmatrix} \begin{bmatrix} N_{C1} \\ N_I \\ N_O \end{bmatrix} \qquad [5]$$

wherein $N_{C1}$ is a speed of clutch C1 70, i.e., the clutch associated with operation in EVT Mode 1, and C1-C6 are application-specific and Neutral range-specific scalar values.

The torque relationship in Neutral is set forth below:

$$\begin{bmatrix} T_A \\ T_B \\ T_O \end{bmatrix} = \begin{bmatrix} C7 & C8 & C9 & C10 \\ C11 & C12 & C13 & C14 \\ C15 & C16 & C17 & C18 \end{bmatrix} \begin{bmatrix} T_I \\ \dot{N}_I \\ \dot{N}_O \\ \dot{N}_{C1} \end{bmatrix} \quad [6]$$

wherein $\dot{N}_{C1}$ is a time-rate change in the speed of clutch C1 associated with operation in EVT Mode 1, and C7-C18 are application-specific and range-specific scalar values.

The powertrain system 100 employs the relationships of select pairs of EQS. 1-6 to control operation of the powertrain system 100, with torque commands and operating speeds determined in response to output torque commands taking into account the transmission range, including a selected one of the fixed gear mode, EVT mode, and Neutral.

Figure 2:
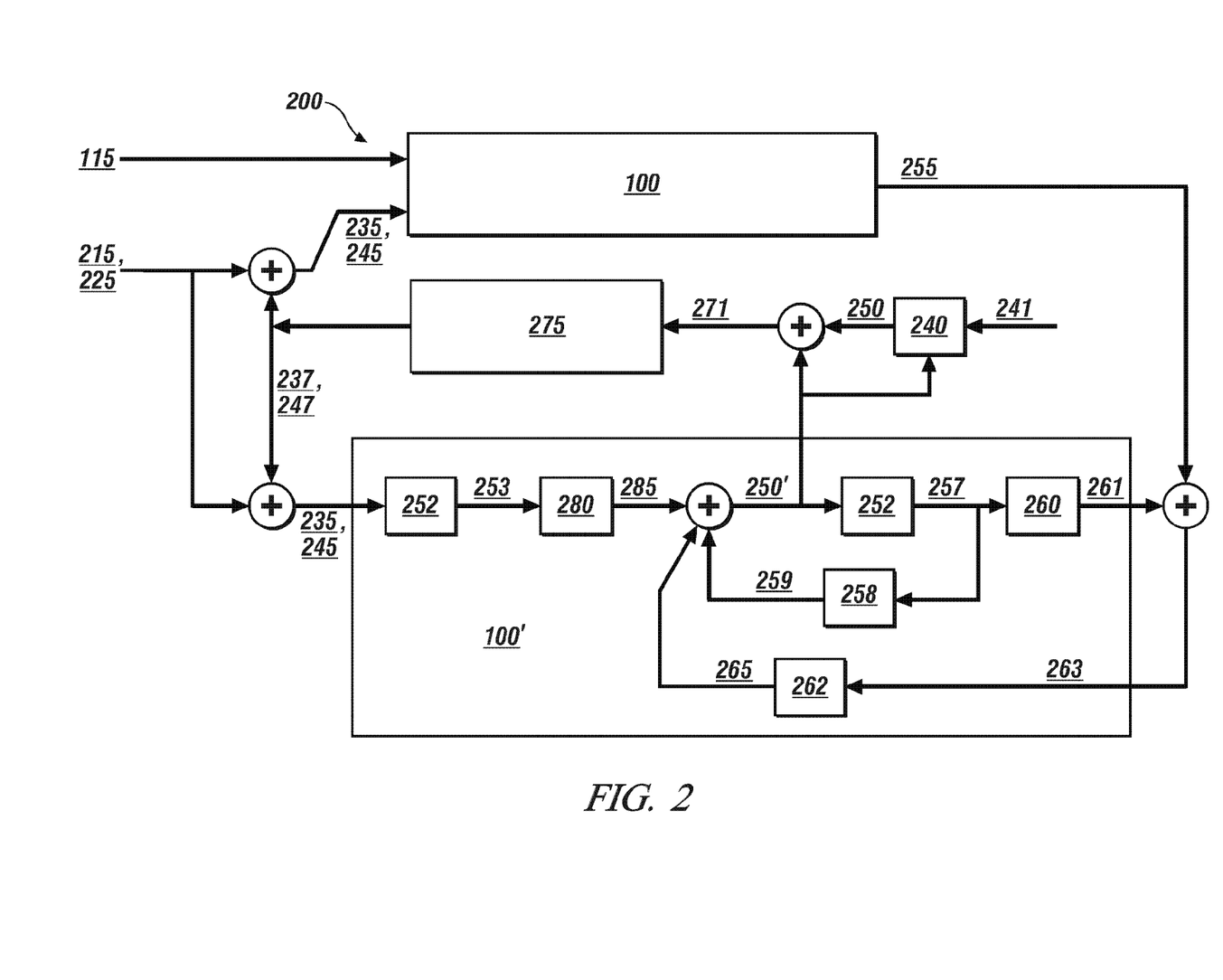
FIG. 2 illustrates a closed-loop speed control system configured to control operation of an embodiment of the multi-mode transmission, in accordance with the disclosure.

FIG. 2 schematically shows an embodiment of a closed-loop speed control system 200 that is configured to control operation of a powertrain system employing a multi-mode transmission, e.g., the powertrain system 100 described with reference to FIG. 1. The closed-loop speed control system 200 employs a feedback controller 275 to control the aforementioned powertrain system 100 with input from a powertrain system estimator 100'. Inputs to the closed-loop speed control system 200 include open-loop motor torque commands Ta 215 and Tb 225 and an engine torque command 115, which are determined in response to an output torque request. The open-loop motor torque commands Ta 215 and Tb 225 are added to first and second torque errors 237 and 247 to determine a control vector that includes first and second final motor torque commands 235, 245, respectively, for controlling the first and second torque machines 56 and 72, respectively. This is an iterative process, with the closed-loop speed control system 200 and all the associated elements and control schemes executed during one of the aforementioned loop cycles to determine the control vector including the first and second final motor torque commands 235, 245 to control the first and second torque machines 56 and 72.

The estimator 100' is configured to predict various output states 250' based upon the control vector including the first and second final motor torque commands 235, 245 and a monitored state vector that includes a plurality of output states 255, which are delayed due to latencies in the system. The output states 255 preferably include select transmission speed states, including by way of example, the input speed $N_I$, output speed $N_O$ or wheel speed $N_w$, and first and second motor speeds $N_A$ and $N_B$. The output states 255 may also include select transmission torque states, including by way of example clutch torques of applied torque transfer clutches. The estimator 100' monitors the control vector including the first and second final motor torque commands 235, 245 and the output states 255.

The control vector passes through a cycle delay 252 to generate a delayed control vector 253 that is input to a controller 280 to calculate a plurality of expected transmission operating states 285 in response thereto. The controller 280 executes selected ones of EQS. 1-6 associated with the selected transmission range to determine the expected transmission operating states 285 in response to the delayed control vector 253, and the expected transmission operating states 285 include expected states for the input speed $N_I$, the output speed $N_O$, and the first and second motor speeds $N_A$ and $N_B$. The expected output states 285 are arithmetically combined with first feedback states 259 and estimation correction output states 265 to determine the estimated output states 250'.

The estimated output states 250' pass through another cycle delay 252 to determine delayed estimated various powertrain states 257, which are input to a feedback loop including a proportional/integral controller 258 to determine the first feedback states 259. The delayed estimated various powertrain states 257 are input to a second feedback loop with proportional/integral controller 260 to determine second feedback states 261, which are subtracted from the output states 255 to determine estimation errors 263. The estimation errors 263 are input to an estimation controller 262 to determine the estimation correction output states 265. Furthermore, the estimated output states 250' and a plurality of input profiles 241 are input to a state reference scheme 240 to calculate or otherwise determine a plurality of reference states 250.

Operation of the powertrain system 100 includes closed-loop speed control that may employ active driveline damping control. The preferred operating parameters include a control signal, e.g., a torque command, and a response signal, e.g., rotational speed, for each of the torque machines, e.g., the first and second torque machines 56 and 72. The reference states 250 include reference states for the output speed ($N_{o\_ref}$), the input or engine speed ($N_{e\_ref}$), and motor speeds for the first torque machine ($N_{a\_ref}$) and the second torque machine ($N_{b\_ref}$). The reference output speed ($N_{o\_ref}$) is related to wheel speed of the vehicle wheels 93, with the wheel speed including an estimated wheel speed ($N_{w\_est}$) as follows.

$$N_{o\_ref} = N_{w\_est} * \text{final drive ratio} \quad [7]$$

The reference speeds can be determined as follows, depending upon the selected one of the transmission ranges including fixed gear mode, EVT mode, and Neutral, employing three sets of independent equations, with the K values, i.e. ratios, selected for the specific transmission range.

Thus, when operating in Neutral, the reference speeds are determined in accordance with the following relationship:

$$N_{e\_ref} = N_{i\_profile}$$

$$N_{a\_ref} = K_{i\_to\_a} * N_{i\_profile} + K_{c\#\_to\_a} * N_{c\#\_profile} + K_{o\_to\_a} * N_{o\_ref}$$

$$N_{b\_ref} = K_{i\_to\_b} * N_{i\_profile} + K_{c\#\_to\_b} * N_{c\#\_profile} + K_{o\_to\_b} * N_{o\_ref} \quad [8]$$

wherein $K_{i\_to\_a}$ and $K_{i\_to\_b}$ represent application-specific scalar values associated with the relation between the input member 12 and Motors A and B, respectively, for the selected transmission range, $K_{c\#\_to\_a}$ and $K_{c\#\_to\_b}$ represent application-specific scalar values associated with the relation between a selected clutch, e.g., clutch C1 and Motors A and B, respectively, for the selected transmission range, $K_{o\_to\_a}$ and $K_{o\_to\_b}$ represent application-specific scalar values associated with the relation between the output member 64 and Motors A and B, respectively, for the selected transmission range, $N_{i\_profile}$ is an input speed profile, which indicates an expected time-rate change in the input speed associated with operation of the engine 14, and $N_{c\#\_profile}$ is a clutch speed profile, which indicates an expected time-rate change in the selected clutch, e.g., clutch C1.

When operating in one of the EVT modes, the reference speeds are determined in accordance with the following relationship.

$$N_{e\_ref} = N_{i\_profile}$$

$$N_{a\_ref} = K_{i\_to\_a} * N_{i\_profile} + K_{o\_to\_a} * N_{o\_ref}$$

$$N_{b\_ref} = K_{i\_to\_b} * N_{i\_profile} + K_{o\_to\_b} * N_{o\_ref} \quad [9]$$

When operating in one of the fixed gear modes, the reference speeds are determined in accordance with the following relationship.

$$N_{e\_ref} = K_{o\_to\_e} * N_{o\_ref}$$

$$N_{a\_ref} = K_{o\_to\_a} * N_{o\_ref}$$

$$N_{b\_ref} = K_{o\_to\_b} * N_{o\_ref} \quad [10]$$

Figure 3:
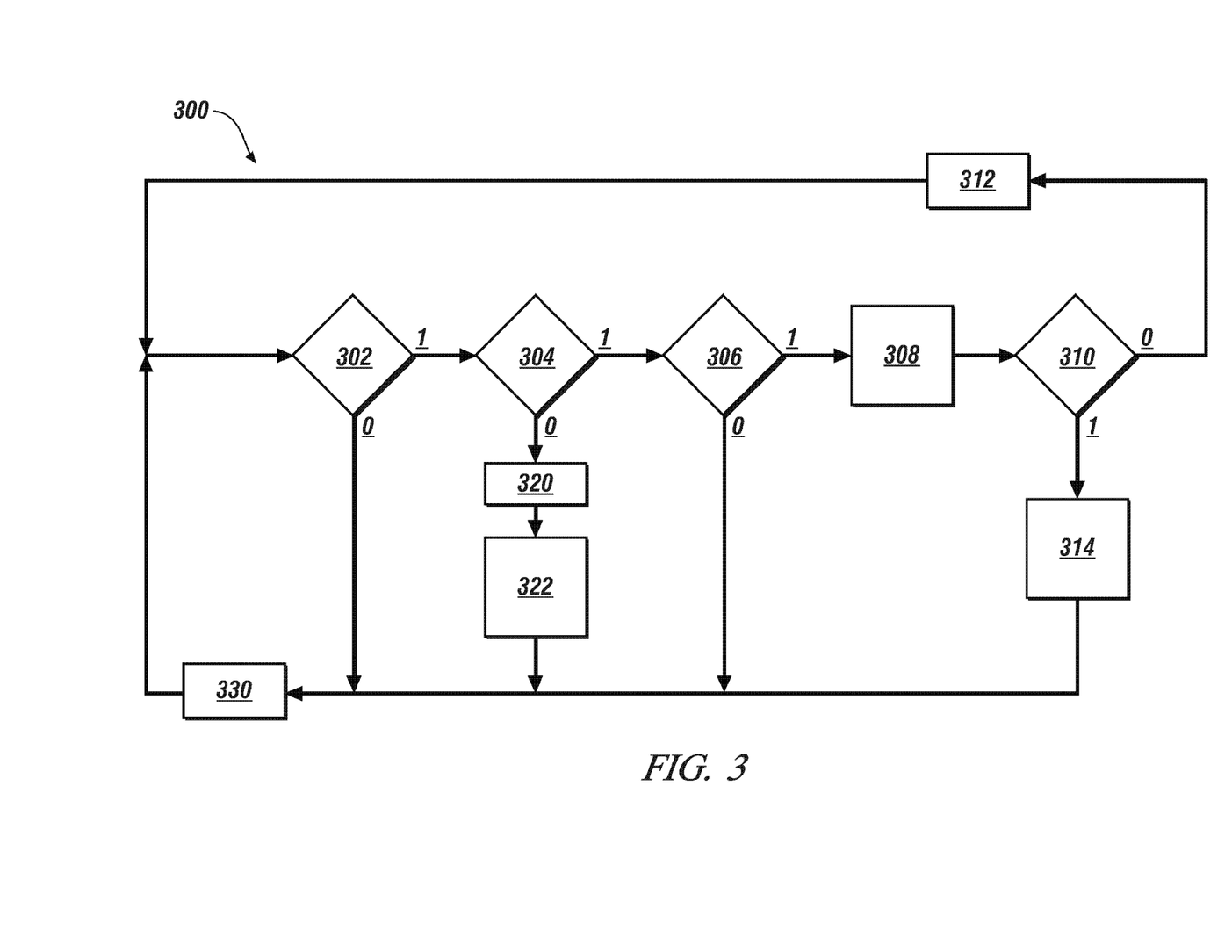
FIG. 3 illustrates a control scheme to monitor operation of an embodiment of the multi-mode powertrain system employing the closed-loop speed control system and responsive to uncontrolled and unpredictable outside forces that cause a rapid change in the output speed in accordance with the disclosure.

Thus, the output speed ($N_{o\_ref}$) is employed to determine each of the reference speeds used in the feedback controller 275 to control the powertrain system 100 with input from the powertrain system estimator 100'. The estimated output states 250' are compared to the reference output states 250 to determine control errors 271, which are employed by the feedback controller 275 to determine first and second torque errors 237 and 247, respectively. When there is inaccuracy in the reference output speed ($N_{o\_ref}$), the related reference speeds including the input or engine speed ($N_{e\_ref}$), and motor speeds for the first torque machine ($N_{a\_ref}$) and the second torque machine ($N_{b\_ref}$) are inaccurate, and thus the control errors 271 are inaccurate. When the control errors 271 are inaccurate, the feedback controller 275 has control inaccuracies FIG. 3 depicts a control scheme 300 to monitor operation and control operation of a powertrain system under dynamic operating conditions. The control scheme 300 is described with reference to an embodiment of the powertrain system 100 employing the closed-loop speed control system 200. The control scheme 300 is employed to cause the powertrain system 100 to be responsive to uncontrolled and unpredictable outside forces that cause a rapid change in a monitored parameter when employing the closed-loop speed control system 200 to control operation thereof. The monitored parameter may include, by way of example, the output speed of the output member 64. Uncontrolled and unpredictable outside forces include forces that are not directly monitored by the closed-loop speed control system 200, and can include an event that causes an abrupt or rapid change in the output speed of the output member 64. An abrupt change in speed of the output member 64 of the powertrain system 100 includes occurrence of a lockup of at least one of the vehicle wheels that translates to lockup of the output member 64 of the powertrain system 100. The term "lockup" describes operation that causes a wheel speed to approach 0 RPM, even for a short period of time. Maneuvers that can lead to a lockup of the output member 64 of the powertrain system 100 include an operator maneuver that includes engaging the transmission range selector 114 in the Park (P) position while the vehicle wheels 94 are rotating and the vehicle is moving, a traction control maneuver, an operator maneuver that activates an anti-lock brake system, a panic brake event, and an acceleration event that includes wheel slip on a low-mu surface. In operation, torque commands for the torque machines are determined in response to a desired input speed of the input member 12 and the reference output speed ($N_{o\_ref}$) of the output member 64. The reference output speed ($N_{o\_ref}$) of the output member 64 is determined based upon estimated wheel speed of one of the driveline wheels 93 as previously described. The estimated wheel speed is set equal to the monitored wheel speed upon detecting an abrupt decrease in measured wheel speed, and torque commands for the torque machines are determined in response to the desired input speed and the measured wheel speed of the wheel using the aforementioned speed and torque equations. The operation of the control scheme 300 is described with reference to FIG. 3. Table 2 is provided as a key wherein the numerically labeled blocks and the corresponding functions are set forth as follows.

TABLE 2

| BLOCK | BLOCK CONTENTS |
|---|---|
| 302 | Does operation cause a rapid change in the output speed No? |
| 304 | Is monitored wheel speed less than a calibrated value? |
| 306 | Is latch set indicating decreasing wheel speed? |
| 308 | Set estimated wheel speed ($N_{w\_est}$) equal to the monitored wheel speed ($N_{w\_act}$); increment counter |
| 310 | Is counter greater than threshold? |
| 312 | Execute closed-loop control of powertrain system using monitored wheel speed($N_{w\_act}$) to calculate reference speeds |
| 314 | Reset counter; reset latch |
| 320 | Reset counter |
| 322 | Set latch to indicate wheel speed is greater than the calibrated value |
| 330 | Execute closed-loop control of powertrain system using estimated wheel speed($N_{w\_est}$) to calculate reference speeds |

The control scheme 300 is periodically executed during one of the aforementioned loop-cycles. Under ongoing operation of the powertrain system, wheel speed ($N_{W\_act}$) is regularly monitored, and an estimated wheel speed ($N_{w\_est}$) is determined by monitoring, conditioning (e.g., rate-limiting), and averaging output signal(s) from one or more of the wheel speed sensors 94. Estimating the wheel speed allows for accommodation of measurement errors, signal noise and delay errors, and inconsistencies in the road surface and tire surface that could cause fluctuation in the output signal(s) from one or more of the wheel speed sensors 94 and thus affect operation of the powertrain control system.

A monitoring strategy initially monitors operation to detect an event caused by uncontrolled and unpredictable outside forces that leads to an abrupt or rapid change in an monitored parameter, such as a lockup of the vehicle wheels 92 (302). An event caused by uncontrolled and unpredictable outside forces is an event that is not tracked by the estimator 100'. Uncontrolled and unpredictable outside forces include forces that are not directly monitored by the closed-loop speed control system 200. A rapid change in the output speed may be caused by an operator maneuver that includes engaging the transmission range selector 114 in the Park (P) position while the wheels are rotating. A rapid change in the output speed may be caused by a traction control maneuver, or a maneuver that activates an anti-lock brake system that pulsewidth-modulates control of the wheel brakes, such as a panic stop. A rapid change in the output speed may instead be caused by vehicle acceleration on a low-friction road surface that leads to wheel spin. During such maneuvers, magnitude of friction brake torque may be inaccurately determined, which introduces error into the powertrain system estimator 100'. Events that cause abrupt or rapid changes in the output speed are caused by forces that are not monitored by the closed-loop speed control system 200 or the control scheme 300. Such forces may include uncontrolled and unpredictable outside forces that can act upon the driveline through one or more of the wheels, and often result in rapid deceleration events.

When there is not a rapid change in the output speed (302) (0), closed-loop control of powertrain system is executed using the estimated wheel speed ($N_{w\_est}$) to calculate the reference output speed ($N_{o\_ref}$) using EQ. 7, which in turn is used to calculate the input or engine speed ($N_{e\_ref}$), and motor speeds for the first torque machine ($N_{a\_ref}$) and the second torque machine ($N_{b\_ref}$) using a selected one of EQS. 8, 9, and 10 (330). When there is an event that causes a rapid change in the output speed that is not tracked by the estimator 100', e.g., a lockup of the vehicle wheels (302)(1), wheel speed is monitored in reference to a calibrated threshold speed (304). When the monitored wheel speed is greater than the threshold speed (304)(0), a counter is reset (320) and a latch is set indicating the wheel speed is greater than the calibrated value (322). Closed-loop control of the powertrain system is executed using the estimated wheel speed ($N_{w\_est}$) to calculate the reference output speed ($N_{o\_ref}$) using EQ. 7, which in turn is used to calculate the input or engine speed ($N_{e\_ref}$), and motor speeds for the first torque machine ($N_{a\_ref}$) and the second torque machine ($N_{b\_ref}$) using a selected one of EQS. 8, 9, and 10 (330).

When the monitored wheel speed is less than the calibrated value (304)(1), it is determined whether the latch has been set during a previous execution of the control scheme 300, which indicates that the wheel speed is decreasing (306). If the wheel speed not decreasing (306)(0), closed-loop control of powertrain system is executed using the estimated wheel speed ($N_{w\_est}$) to calculate the reference output speed ($N_{o\_ref}$) using EQ. 7, which in turn is used to calculate the input or engine speed ($N_{e\_ref}$), and motor speeds for the first torque machine ($N_{a\_ref}$) and the second torque machine ($N_{b\_ref}$) using a selected one of EQS. 8, 9, and 10 (330).

When the wheel speed is decreasing (306)(1) after the aforementioned conditions have been met, estimated wheel speed ($N_{w\_est}$) is set equal to a monitored wheel speed ($N_{w\_act}$) as indicated by the wheel speed sensor 94 and the counter is incremented (308). In one embodiment, the estimated input speed $N_I$ is set equal to the monitored input speed, and the estimated first and second motor speeds $N_A$ and $N_B$ are set equal to monitored first and second motor speeds. The counter is compared to a threshold timer (310), and closed-loop control of the powertrain system is executed using the monitored wheel speed ($N_{w\_act}$) (312) when the counter is less than the threshold timer (310)(0). When the counter is greater than the threshold timer (310)(1), the latch and the counter are reset and closed-loop control of powertrain system is executed using the estimated wheel speed ($N_{w\_est}$) to calculate the reference output speed ($N_{o\_ref}$) using EQ. 7, which in turn is used to calculate the input or engine speed ($N_{e\_ref}$), and motor speeds for the first torque machine ($N_{a\_ref}$) and the second torque machine ($N_{b\_ref}$) using a selected one of EQS. 8, 9, and 10 (330).

Figure 4:
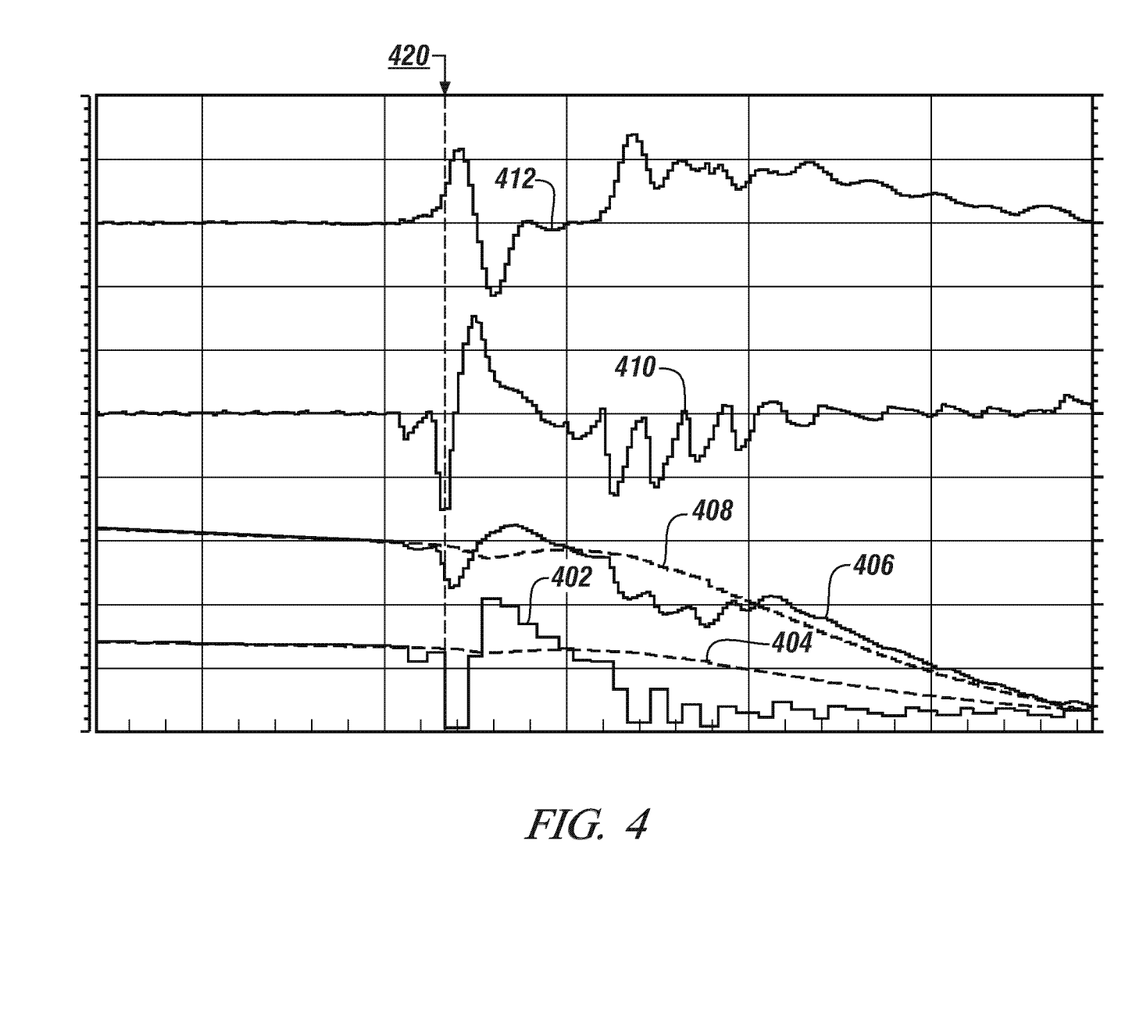
FIG. 4 illustrates a plurality of powertrain operating states in relation to elapsed time for an embodiment of the powertrain system operating without benefit of the control scheme 300 described herein, in accordance with the disclosure.

FIG. 4 graphically shows a plurality of powertrain operating states in relation to elapsed time for an embodiment of the powertrain system 100 operating with an embodiment of the closed-loop speed control system 200 without benefit of the control scheme 300 described herein. Depicted powertrain operating states include measured wheel speed 402, estimated wheel speed 404, estimated output speed 406, reference output speed 408, engine speed 410, and damping torque 412. At time point 420, the measured wheel speed 402 drops suddenly, approaching 0 RPM indicating a wheel lockup caused by an operator maneuver, a traction control maneuver, or a maneuver that activates an anti-lock brake system. The estimated wheel speed 404 reacts slowly, causing corresponding changes in the estimated output speed 406 and the reference output speed 408 including deviations therebetween. The powertrain operating system determines the damping torque 412 which tries to push the estimated output speed 406 towards the reference output speed 408, even though the reference output speed 408 is incorrect. This causes the damping torque 412 to be applied in an incorrect direction. The result in that the engine speed 410 may include backward spin of the engine, which is an undesired operating condition, as it may cause the engine to stall if the engine is presently operating.

Figure 5:
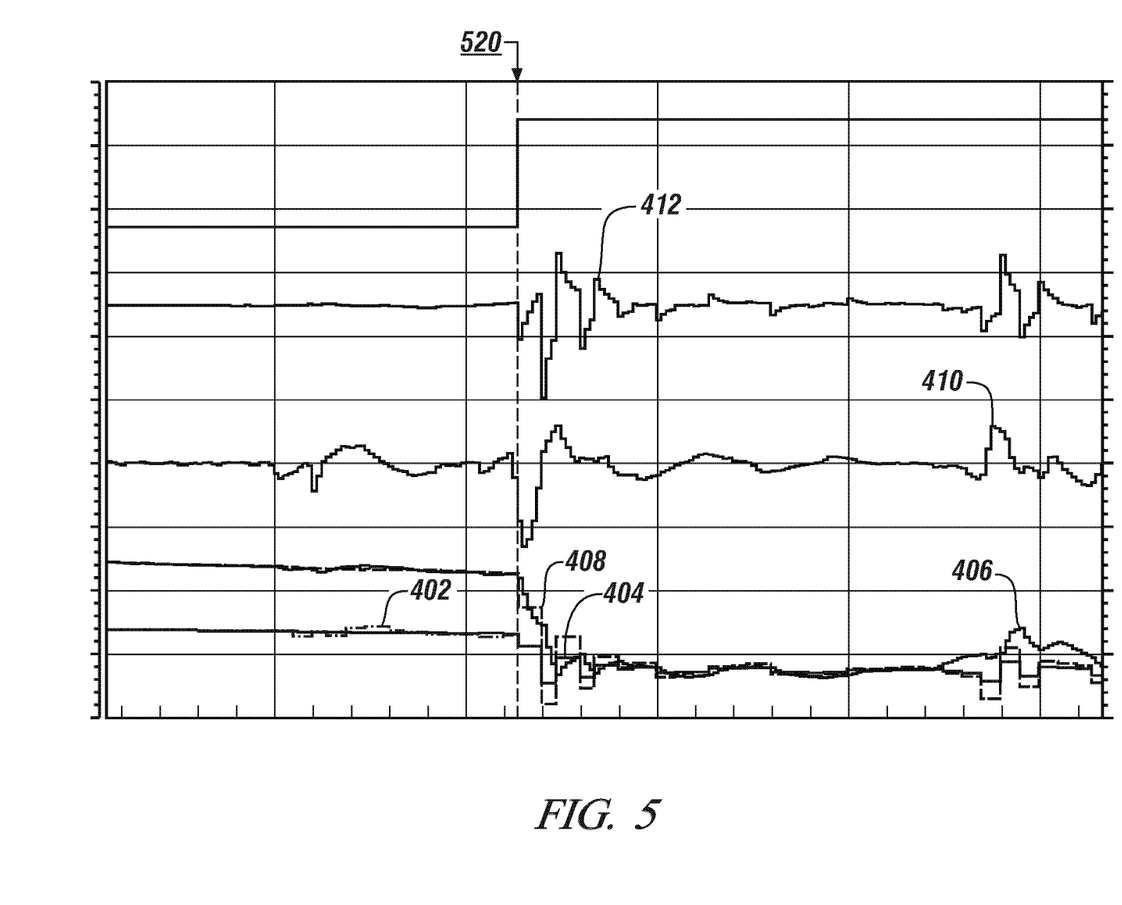
FIG. 5 illustrates the plurality of powertrain operating states in relation to elapsed time for an embodiment of the powertrain system operating with the control scheme 300 described herein, in accordance with the disclosure.

FIG. 5 graphically shows the plurality of powertrain operating states in relation to elapsed time for an embodiment of the powertrain system 100 operating with an embodiment of the closed-loop speed control system 200 and operating with the control scheme 300 described herein. Depicted powertrain operating states again include the measured wheel speed 402, estimated wheel speed 404, estimated output speed 406, reference output speed 408, engine speed 410, and damping torque 412. At time point 520, an action occurs that causes the measured wheel speed 402 to drop suddenly, and falling below the speed threshold, thus indicating a wheel lockup caused by an operator maneuver, a traction control maneuver, or a maneuver that activates an anti-lock brake system. The estimated wheel speed 404 is initialized to the measured wheel speed 402, causing the reference output speed 408 to match the estimated output speed 406. The reference output speed 408 tracks the measured wheel speed 402 while the estimated output speed 406 starts to change in response to the inputs. The powertrain operating system determines the damping torque 412 which tries to push the estimated output speed 406 towards the reference output speed 408, which closely reflects the measured wheel speed 402. This causes the damping torque 412 to be applied in a correct rotational direction in relation to a desired torque direction. The result is that the engine speed 410 is controlled. Some minor backward spin of the engine may occur due to effect of suddenly stopping the rotation of the engine.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling operation of a multi-mode transmission configured to transfer torque among an input member coupled to an internal combustion engine, torque machines and an output member in one of a plurality of fixed gear modes, continuously variable modes and Neutral, the method comprising:

employing a closed-loop control scheme to determine torque commands for the torque machines in response to a desired input speed of the input member and an estimated wheel speed of a wheel of a driveline coupled to the output member; and upon detecting an abrupt change in an output speed of the output member causing lockup of the output member, employing the closed-loop control scheme to determine torque commands for the torque machines in response to the desired input speed of the input member and a monitored wheel speed of the wheel of the driveline.

2. Method for controlling operation of a multi-mode transmission configured to transfer torque among an input member coupled to an internal combustion engine, torque machines and an output member, the method comprising:

determining torque commands for the torque machines in response to a desired input speed of the input member and an output speed of the output member, the output speed determined based upon an estimated wheel speed of a wheel of a driveline coupled to the output member; and upon detecting an abrupt change in wheel speed of said wheel causing lockup of the output member, setting the estimated wheel speed equal to a monitored wheel speed and determining torque commands for the torque machines in response to said desired input speed and the monitored wheel speed.

3. The method of claim 2, wherein determining torque commands for the torque machines comprises employing a closed-loop control system to determine the torque commands based on the monitored wheel speed.

4. The method of claim 3, wherein employing the closed-loop control system to determine the torque commands comprises:
  executing a closed-loop speed control system to determine torque errors based on the desired input speed and the monitored wheel speed; and
  employing the torque errors to adjust the torque commands.

5. The method of claim 4, wherein the closed-loop speed control system to determine torque errors comprises a powertrain system estimator and a feedback controller.

6. The method of claim 4, wherein executing the closed-loop speed control system to determine torque errors comprises executing the closed-loop speed control system while the multi-mode transmission is in a fixed gear mode.

7. The method of claim 4, wherein executing the closed-loop speed control system to determine torque errors comprises executing the closed-loop speed control system while the multi-mode transmission is in a continuously variable mode.

8. The method of claim 4, wherein executing the closed-loop speed control system to determine torque errors comprises executing the closed-loop speed control system while the multi-mode transmission is in Neutral.

9. The method of claim 2, wherein the abrupt change in wheel speed comprises engagement of a transmission range selector in a Park position while the wheel is rotating.

10. The method of claim 2, wherein the abrupt change in wheel speed comprises a traction control maneuver.

11. The method of claim 2, wherein the abrupt change in the wheel speed comprises activation of an anti-lock brake system.

12. The method of claim 2, wherein the abrupt change in the wheel speed comprises acceleration on a low-friction road surface.

13. Method for controlling operation of a multi-mode transmission configured to transfer torque among an input member coupled to an internal combustion engine, torque machines and an output member in one of a plurality of fixed gear modes, continuously variable modes and Neutral, the method comprising:
  employing a closed-loop control scheme to determine torque commands for the torque machines in response to a desired input speed of the input member and an estimated wheel speed of a wheel of a driveline coupled to the output member; and
  in response to an outside force affecting a monitored parameter causing lockup of the output member, setting the estimated wheel speed equal to a monitored wheel speed and employing the closed-loop control scheme to determine torque commands for the torque machines in response to the desired input speed and the monitored wheel speed.

14. The method of claim 13, wherein employing the closed-loop control system to determine the torque commands comprises:
  executing a closed-loop speed control system to determine torque errors in response to the desired input speed and the monitored wheel speed; and
  employing the torque errors to adjust the torque commands.

15. The method of claim 14, wherein the closed-loop speed control system to determine torque errors comprises a powertrain system estimator and a feedback controller.

16. The method of claim 14, wherein executing the closed-loop speed control system to determine torque errors comprises executing the closed-loop speed control system while the multi-mode transmission is in a fixed gear mode.

17. The method of claim 14, wherein executing the closed-loop speed control system to determine torque errors comprises executing the closed-loop speed control system while the multi-mode transmission is in a continuously variable mode.

18. The method of claim 14, wherein executing the closed-loop speed control system to determine torque errors comprises executing the closed-loop speed control system while the multi-mode transmission is in Neutral.

\* \* \* \* \*